No. 879,055. PATENTED FEB. 11, 1908.
C. KUHNERT.
VERMIN ERADICATOR.
APPLICATION FILED OCT. 26, 1907.
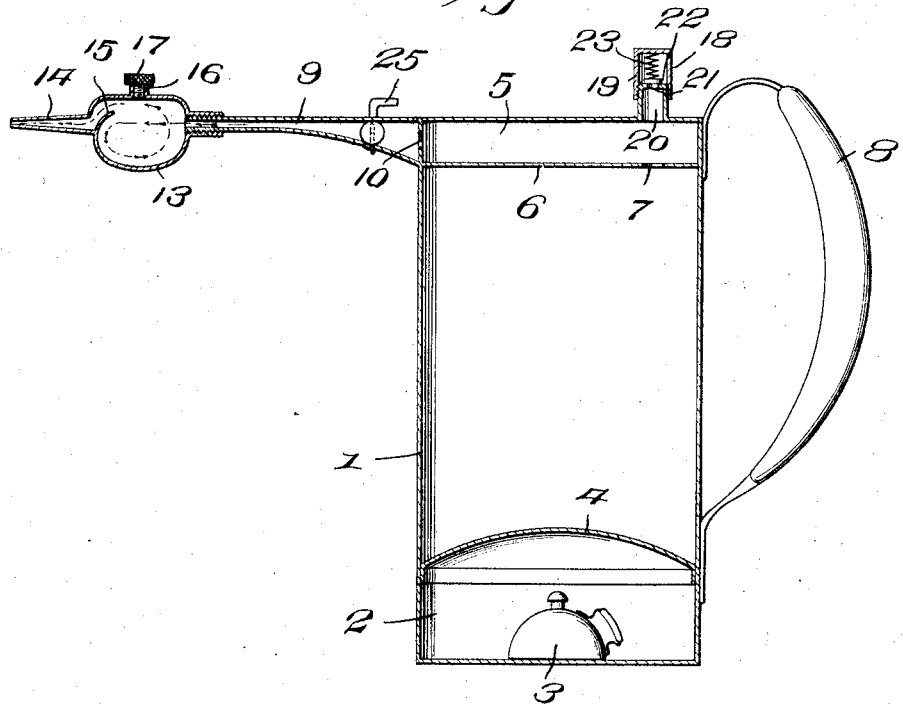
Fig. 1.
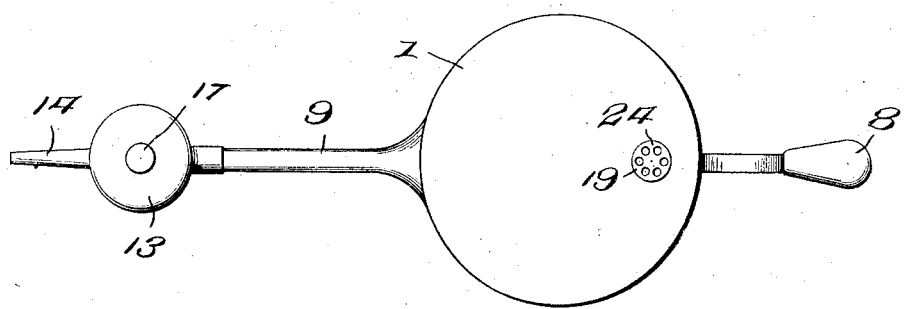
Fig. 2.
Fig. 3.
WITNESSES: INVENTOR
C. Kuhnert
By W. J. FitzGerald
Attorneys

UNITED STATES PATENT OFFICE.

CHARLES KUHNERT, OF CHICAGO, ILLINOIS.

VERMIN-ERADICATOR.

No. 879,055.	Specification of Letters Patent.	Patented Feb. 11, 1908.

Application filed October 26, 1907. Serial No. 399,317.

*To all whom it may concern:*

Be it known that I, CHARLES KUHNERT, a citizen of the United States, residing at Chicago, in the county of Cook and State of Illinois, have invented certain new and useful Improvements in Vermin - Eradicators; and I do hereby declare the following to be a full, clear, and exact description of the invention, such as will enable others skilled in the art to which it appertains to make and use the same.

My invention relates to new and useful improvements in vermin eradicators and more particularly to that class adapted to be employed in buildings for destroying insects or disinfecting purposes and my object is to provide a device of this class, in which water may be heated and the steam arising therefrom directed into crevices or other places to destroy insects.

A further object is to provide means for heating the water.

A further object is to provide a steam cavity and a still further object is to provide means for placing disinfecting substances in position to be commingled and conveyed by the escaping steam.

Other objects and advantages will be hereinafter referred to and more particularly pointed out in the claims.

In the accompanying drawings which are made a part of this application, Figure 1 is a central, vertical, sectional view through the body of the eradicator. Fig. 2 is a top plan view thereof, and, Fig. 3 is a plan view of a hose and nozzle, employed in connection with the eradicator.

Referring to the drawings in which similar reference numerals designate corresponding parts throughout the several views, 1 indicates the body of the eradicator, the lower portion of which is provided with a compartment 2, in which is adapted to be placed any suitable form of heat-producing appliance, such as a vapor lamp 3, or the like, said compartment being separated from the remainder of the body 1, by means of a dome-like partition 4. The upper end of the body 1 is also provided with a steam chamber 5, which is separated from the remainder of the body 1 by means of an auxiliary partition 6, said steam chamber being placed in communication with the body 1, by means of a port 7, said port being located adjacent one edge of the auxiliary partition, so that when the body is disposed in a horizontal position, the water in the body will be prevented from entering the steam chamber and in order to readily handle the body portion, and tilt the same, as desired, a handle 8 is secured to the outer surface of the body 1.

The upper end of the body is provided with a spout 9, which communicates with an auxiliary port 10, extending through the wall of the steam chamber 5, said spout being located on the body portion at a point diametrically opposite the handle 8.

When the device is being employed for destroying insects, the body is filled with water and heated by means of the lamp, or otherwise, the steam arising from the heated water passing through the port 7 and into the steam chamber 5, from whence it passes through the auxiliary port 10 into the spout 9 and in order to readily direct the steam into crevices or other places occupied by the insects, a hose 11 may be secured to the outer end of the spout 9, said hose being provided at its outer end with a nozzle 12, which is reduced at its outer end to cause the steam to pass therethrough under pressure, thereby driving the steam a distance from the end of the nozzle. If, however, the device is being employed for disinfecting purposes, the hose 11 is removed from the end of the spout 9 and a cup 13 substituted therefor, said cup being adapted to hold disinfectants and in order to cause the steam to commingle with the disinfecting substance and carry the same from the cup, the nozzle 14 on the cup is placed in alinement with the opening in the spout 9 and an inwardly curved shield 15 extended upwardly from the lower edge of the nozzle, so that the steam, in leaving the spout 9, will engage the curved shield and pass into the lower portion of the cup 13 and into engagement with the disinfectant therein, the path of the steam through the cup 13, being circuitous as shown by arrows in Fig. 1 of the drawings.

The disinfectant is introduced into the cup 13 through an opening 16 in the upper portion of the cup, which is normally closed by a screw 17, so that when it is necessary to replenish the disinfectant, the screw may be removed and the cup filled, after which the screw is returned into the opening 16 and the cup applied to use.

To prevent an undue amount of steam collecting in the chamber 5, said chamber is provided with a pop valve 18, which consists of a cap 19, extending over a tubular projection 20, said projection having a bore 21 in the outer end thereof, over which is disposed a valve 22, said valve being held in its normally closed position by means of a spring 23, said spring being of sufficient tension to hold the valve closed until a certain head of steam is attained in the steam chamber and when the steam pressure is increased above this point, or above ten pounds, more or less, the valve 22 will be elevated and the steam allowed to escape through vents 24 in the upper end of the cap 19.

The steam is retained in the chamber 5 until the pop valve is operated, by means of a cock 25 which is placed in the spout 9 between the port 10 and outer end of the spout and is adapted to be closed until the steam is generated and to be opened when the device is in use.

The lamp 3 is fixed in the compartment 2, so that the body 1 may be turned to a horizontal position in order to direct the steam around the base board of a room, or similar crevices, and by placing the port 7 in that edge of the partition 6, adjacent the handle 8, it will be seen that the water in the body 1 will be below the port 7 and will not enter the steam chamber 5, unless the body is tilted beyond a horizontal plane.

The pop valve 18 is located immediately above the port 7, so that by removing the cup 19 from the projection 20, water may be readily introduced into the body through the bore 21 and port 7.

It will thus be seen that I have provided a very cheap and economical form of device for destroying insects and vermin by the use of steam and it will be further seen that by providing the cup and utilizing the same, as shown, a room may be thoroughly disinfected and the disinfectant deposited in all parts of the room and especially in the crevices formed between the walls and trimmings of the room.

What I claim is:

1. In a device of the class described, the combination with a body having a compartment in one end and a steam chamber at the opposite end, a heating device in said compartment, said steam chamber and body having a communicating port, a spout extending from said steam chamber, said spout and steam chamber communicating through an auxiliary port, a cup adapted to fit over the end of said spout and contain disinfectants, a nozzle on said cup and means to direct the steam from the spout in a circuitous path in the cup before entering said nozzle.

2. In a device of the class described, the combination with a body having a compartment in one end thereof, and a steam chamber in the opposite end thereof, communication between said steam chamber and body being through a port, a spout extending from said steam chamber, and communicating with said steam chamber through an auxiliary port, a cup on said spout, adapted to hold disinfectants, a nozzle on said cup, a shield between said nozzle and spout, whereby the steam will be directed through the disinfectant before entering the nozzle.

3. In a device of the class described, the combination with a body; of a partition in said body, adapted to form a compartment, an auxiliary partition in the opposite end of said body, adapted to form a steam chamber, said auxiliary partition having a port communicating with said body and steam chamber, said port being adjacent one edge of the partition, a spout extending from said steam chamber, and communicating therewith through a port, a handle for said body and a pop valve on said steam chamber.

In testimony whereof I have signed my name to this specification in the presence of two subscribing witnesses.

CHARLES KUHNERT.

Witnesses:
 Otis N. Walton,
 C. A. Iorns.